Patented June 15, 1943

2,322,073

UNITED STATES PATENT OFFICE 2,322,073

OLEFINIC INTERPOLYMERIZATION PROCESS AND PRODUCT

Robert M. Thomas, Union, N. J., and William J. Sparks, Alexandria, Va., assignors, by mesne assignments, to Jasco, Incorporated, a corporation of Louisiana No Drawing. Application December 21, 1939, Serial No. 310,341

20 Claims. (Cl. 260—79)

This invention relates to new, improved and useful polymeric materials, and relates particularly to interpolymeric materials which are resistant to solvents; and to methods for preparing polymers. More particularly, the invention relates to the preparation of copolymers of isoolefins with non-conjugated diolefins or isoolefins and conjugated diolefins with non-conjugated diolefins having terminal isopropenyl groups

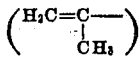

separated by at least one carbon atom.

It has been found possible to polymerize isoolefins, particularly isobutylene, into exceedingly high molecular weight substances which are plastic, elastic, and substantially saturated polymeric bodies in which the chemical structure is believed to be an extremely long chain of carbon atoms to the various atoms of which there are attached, either side chains of alkyl groups, or hydrogen. Each large molecule is thought to have only a single double bond, or chemically unsaturated linkage, between carbon atoms.

The method of production of these polymers utilizes a low temperature technique, in which the isoolefin is cooled to a low temperature ranging from 0° C. downward to —50° C., —78° C., —100° C. or lower. This low temperature is obtained by the use of a diluent-refrigerant such as liquefied ethylene, propane with solid $CO_2$, liquid methane or ethane or other suitable refrigerant-diluents. The polymerization is conducted by the application of a catalyst such as boron trifluoride or aluminum chloride dissolved in an inert and low freezing point solvent such as methyl or ethyl chloride.

This low temperature technique has been applied to mixtures of an isoolefin such as isobutylene with conjugated diolefins such as butadiene, isoprene, pentadiene, and dimethyl butadiene to produce interpolymers or mixed polymers containing a structure derived from the mixture of isoolefin and diolefin, in which the amount of chemical unsaturation is higher than is the case with polymers of isoolefins alone. Both of these simple and mixed polymers are soluble in most of the aliphatic solvents, soluble in many of the aromatic solvents, and soluble in most of the chlorinated aliphatic solvents. Moreover, these polymers are exceedingly resistant to acids, alkalies, oxidation, ozone, weathering, and similar influences. They are insoluble in substantially all of the oxygenated solvents. The simple isoolefinic polymers are not readily reacted with sulfur, whereas the mixed polymers or interpolymers can be readily combined with sulfur directly and cured, especially in the presence of a sulfurization aid such as tetramethyl thiuram disulfide.

However, the solubility of these polymers in aliphatic solvents, aromatic solvents, and chlorinated aliphatic solvents restricts their usefulness for many purposes and the insoluble polymers are desirable for many uses such as construction materials.

The present invention provides a new type of insoluble interpolymer in which the interpolymerization occurs between an isoolefin such as isobutylene and a non-conjugated diolefin of the type of a diisopropenyl substituted hydrocarbon compound such as dimethallyl and its homologues, or between an isoolefin, conjugated diolefin, and non-conjugated diolefin such as dimethallyl and its homologues.

The polymer is produced by a low temperature polymerization technique similar to that above described, using a diluent-refrigerant, and a dissolved Friedel-Crafts type catalyst, for example, aluminum chloride dissolved in an alkyl halide. The resulting polymers are elastic, plastic substances having physical characteristics closely similar to those of polyisobutylene or the mixed polymers of isobutylene and conjugated diolefins. In addition, the mixed polymers of the present invention are substantially insoluble in hydrocarbon solvents, either aliphatic, aromatic or chlorinated, and also are insoluble in the ordinary oxygenated solvents, and are not influenced by acid, alkali, water solutions and similar chemical substances.

These mixed polymers of the present invention containing non-conjugated diolefins having terminal isopropenyl groups separated by at least one carbon atom can be combined with sulfur monochloride or can be combined with sulfur under the influence of a sulfurization aid such as tetramethyl thiuram disulfide in a manner comparable with that of the above-mentioned interpolymers of isobutylene and conjugated diolefins.

Thus an object of this invention is to interpolymerize an isoolefin such as isobutylene with a non-conjugated diolefin such as dimethallyl and its homologues to produce a high molecular weight polymer which is plastic, elastic, and resistant to solvents and chemical agents generally.

Other objects and details of the invention will be apparent from the following description:

In practicing the invention, liquefied mixtures of isobutylene and dimethallyl or its homologues, having the type formula

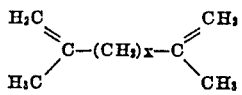

in which X is an integer, the maximum value of which is unknown but probably above 20, and the preferred range from 1 to 6, are prepared and cooled to temperatures ranging from 0° C., or preferably from −50° C., to −100° C. or −150° C. or lower. The cooled mixtures are then polymerized by the application of a Friedel-Crafts type catalyst, preferably aluminum chloride dissolved in a suitable solvent such as ethyl or methyl chloride, or by the application of boron trifluoride, preferably also dissolved in an alkyl halide. The polymerization occurs rapidly to yield the desired polymer which is separated from the reaction mixture and quickly washed in water or alkaline solution. This polymer is found to be substantially insoluble in organic solvents generally, including aromatic, aliphatic, chlorinated aliphatic, and hydrogenated solvents.

Isobutylene is the preferred isoolefinic substance, but other olefins such as the isoamylenes may be used. For the non-conjugated diolefin, a preferred substance is dimethallyl

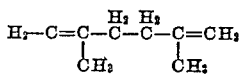

This substance contains two carbon atoms (and attached hydrogen atoms) interposed between the isopropenyl terminal groups. The corresponding substance containing but a single interposed carbon atom is also useful, as are the several higher homologues, containing three to six carbon atoms interposed between the isopropenyl radicals. Higher molecular weight compounds containing still larger numbers of interposed carbon atoms may also be used.

In preparing the mixture of isobutylene and the non-conjugated diolefin, it is preferable that the isobutylene predominate and that relatively small quantities only of the non-conjugated diolefin be present. The preferred ratio of proportions of isoolefin to non-conjugated diolefin is from 80 parts of isoolefin to 20 parts of diolefin to a ratio of 99.99 parts by weight of isoolefin to 0.01 part by weight of diolefin.

*Example 1*

A mixture of isobutylene in the proportion of 95 parts to dimethallyl in the proportion of 5 parts is added to approximately 200 parts of liquid ethylene, the boiling temperature of the mixture being approximately −98° C. Simultaneously, a catalyst solution is prepared, consisting, for example, of methyl chloride saturated with aluminum chloride at the boiling temperature of methyl chloride (−24° C.) under atmospheric pressure. This catalyst solution is then cooled to a low temperature, preferably below −50° C., and conveniently to the temperature of −78° C., which is the subliming temperature of solid $CO_2$, then diluted with further quantities of cooled methyl chloride to an ultimate concentration of approximately 0.5 part of aluminum chloride per 100 parts of the catalyst solution. The cooled catalyst solution is then added to the cooled mixture of reactants and diluent-refrigerant, preferably by spraying the cooled catalyst onto the surface of the well-stirred reaction mixture. The reaction occurs rapidly, and precipitates a white polymer. The total amount of catalyst to be added is introduced within a few minutes. Using a suitable quantity of catalyst, such a time interval is sufficient to cause the polymerization of one half to two thirds of the mixed olefinic bodies. Upon the discontinuance of the addition of the catalyst spray, the polymerization reaction substantially ceases. At this point it is desirable that any further polymerization be prevented by quenching the residual catalyst. This is conveniently accomplished by adding to the reaction mixture a small amount of an oxygenated, organic compound such as ethyl or methyl alcohol, acetone, or other similar substance selected from the class of oxygenated organic compounds. Alternatively, alkaline substances such as ammonia, soda solution in water, caustic solution or water itself may be utilized. The solid polymer is then separated from the reaction mixture, warmed to room temperature, and washed to remove traces of catalyst or residual traces of unpolymerized olefins or diluent-refrigerant.

*Example 2*

A mixture of isobutylene in the proportion of 95 parts with dimethallyl in the proportion of 5 parts was diluted with an equal volume of methyl chloride and cooled to a temperature of −78° C. by the addition of a substantial excess of dry ice. The mixture was then treated with a catalyst consisting of aluminum chloride dissolved in methyl chloride at a temperature of approximately −78° C. by spraying the catalyst onto the surface of the chilled mixture. The polymer formed instantly and was found to be tough, inelastic and insoluble in common solvents in the same manner as in Example 1, but the polymer appears to be of lower molecular weight than that derived from Example 1.

*Example 3*

The same mixture was prepared as in Example 2 consisting of isobutylene and dimethallyl in the same proportion with an equal volume of methyl chloride, the mixture being chilled by solid carbon dioxide to −78° C. Gaseous boron trifluoride was bubbled through the mixture to serve as catalyst. The polymer precipitated promptly, but was somewhat sticky, and of lower molecular weight than the product obtained in the foregoing example.

*Example 4*

A mixture of isobutylene in the proportion of 99.99 parts of isobutylene with 0.01 part of dimethallyl was prepared with an equal volume of methyl chloride and chilled with solid carbon dioxide as in Examples 2 and 3. Aluminum chloride dissolved in methyl chloride was sprayed in as catalyst, and the polymer precipitated promptly. This polymer resembled the simple polyisobutylene very closely in its properties, but it was insoluble in the common solvents.

It may be noted that these products, while insoluble, swelled more or less, particularly in the hydrocarbon solvents.

*Example 5*

A mixture of dimethallyl with an equal volume of methyl chloride was prepared and cooled to −78° C. by the application of an excess of solid carbon dioxide and treated with a chilled solution of aluminum chloride in methyl chloride prepared as in Example 1. A polymeric precipitate appeared promptly which was found to be non-brittle, but relatively non-elastic. The polymer was somewhat plastic and flexible, but not particularly rubbery in general characteristics.

The above examples present polymers produced from mixtures of two olefinic substances. It is not, however, necessary to limit the polymerization reactants to two olefins. For example, mixtures of isobutylene, butadiene and dimethallyl are readily polymerized into three component interpolymers. This reaction is characteristic not only of dimethallyl but also of its homologues, as above pointed out. Likewise, it is characteristic of the conjugated diolefins such as butadiene, isoprene, dimethyl butadiene, pentadiene, etc.; and in some instances, other monoolefins such as the amylenes and their homologues are similarly usable.

These polymers may be compounded with a wide variety of substances, such as carbon black, zinc oxide, stearic acid, lithopone, clay, barytes, ferric oxide, chromic oxide, wood flour, cellulosic materials generally, and similar inert substances as well as with sulfur and sulfo-genetic substances.

Example 6

A mixture of isobutylene in the proportion of 79 parts, butadiene 20 parts, and dimethallyl 1 part, with 200 parts of ethylene, was prepared and cooled to a temperature of approximately —98° C. The mixture was then treated with a catalyst consisting of aluminum chloride in an alkyl chloride such as methyl chloride in the proportion of approximately 0.5%. As in the previous examples, the polymer formed promptly and precipitated from the reaction mixture. The addition of the catalyst spray was continued until a substantial portion of the reactants had polymerized and precipitated. Upon discontinuance of the catalyst spray, the polymerization reaction substantially ceased. However, at the termination of the catalyst spray, a substantial quantity of isopropyl alcohol was added to prevent further polymerization by quenching the catalyst. The product was removed, washed, dried, and compounded as previously suggested. The polymer produced by this reaction is closely similar to those previously described, but with a somewhat higher amount of unsaturation.

It may be noted also that such diolefins as chloroprene, fluoroprene, and the homologues are also similarly reactive in this polymerization procedure.

The polymerization procedure as previously described may be conducted in batch operations, or may be conducted in continuous operation, by removal of the solid polymer as it is formed, and replacement of the reactant mix and diluent-refrigerant. The vaporized diluent-refrigerant, especially if it is ethylene, is desirably recovered, purified, and recondensed for recycling. It may be noted that the polymerization reaction is exothermic, and the heat of polymerization produced thereby is absorbed in the latent heat of vaporization of the diluent-refrigerant.

The above disclosure indicates the desirability of the quenching of residual catalyst before the polymerization is complete, in batch operations. This is not essential, although desirable, since by proper control it is possible to polymerize substantially all of the olefinic substances in the mixture, to valuable polymeric substances.

The isobutylene is conveniently obtained as a by-product from petroleum cracking operations; the dimethallyl is readily produced by condensation of methallyl chloride in the presence of a suitable metal such as magnesium suspended in dry ethyl ether, according to the following reaction:

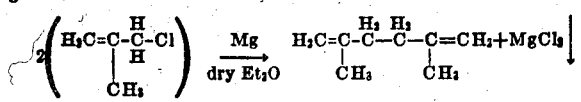

The polymeric or interpolymeric substances of this invention are colorless, plastic materials having a high elongation, and in general a "rubbery" character. They are exceedingly insoluble in practically all solvents.

The general character of the material indicates that it has a very high molecular weight, which is believed to be certainly above 10,000, and probably above 100,000, but in view of its insolubility in substantially all solvents, it has not been possible as yet to ascertain the actual molecular weight or range of molecular weights.

The material as above produced is desirable for such uses as conduits or hose for solvents, as an insulating material for cables and electrical conductors generally, for the impregnation and filling of fabrics generally, and for a wide range of similar purposes where a solvent-resistant plastic, elastic substance is advantageous.

The material will combine with sulfur under conditions of elevated temperature, particularly in the presence of sulfurization aids such as tetramethyl thiuram disulfide and when so combined has appreciable tensile strength, for example from 2,000 pounds per square inch to 4,500 pounds per square inch, has a high elongation ranging from 500% to 1100%, and has a good resistance to flexure and abrasion.

The material is particularly advantageous for tank linings and similar uses where its high resistance to acid, alkali and solvents generally is of value for the production of durable, long-wearing containers of various types. Such containers may be acid and alkali storage tanks, polymer lined metal packages for solvents, acids, alkalies, food products generally and similar uses, as well as for such uses as storage battery cases and separators or hose structures for conveying acids, alkalies, solvents and similar fluids. Likewise, it is particularly advantageous for use on conveyor belts handling corrosive solids, as rolls for the processing of corrosive substances and similar uses.

By proper control of the polymerization conditions such as temperature, purity of reactants, the addition of polymerization poisons, and the choice of catalysts, it is possible to produce interpolymers of this type which are oily to viscous fluids, which have satisfactory lubricating properties, and at the same time are insoluble in hydrocarbons generally. This characteristic is particularly valuable for use with apparatus in which moving parts must be lubricated while they are in contact with hydrocarbon solvents, this being a problem which is otherwise exceedingly difficult of solution, since substantially all of the hydrocarbon lubricants are soluble in hydrocarbon fluids such as gasoline, and the oil-insoluble oily bodies such as castor oil are either expensive, poisonous, or undesirable for other reasons.

The substance of the invention thus is a long chain, linear, although probably cross-linked, hydrocarbon having a high molecular weight, which is of relatively very low unsaturation, and which behaves substantially like a fully saturated aliphatic substance, which is of oily to solid rubbery characteristics, substantially insoluble in hydrocarbon solvents generally, insoluble in chlorinated hydrocarbons and insoluble in oxygenated hydrocarbons as well as resistant to acid, alkaline and water solutions generally; which may be cured with sulfur to yield a high tensile strength rubbery material having high resistance to flexure and abrasion.

While there are above disclosed but a limited number of embodiments of the present invention, it is possible to produce still other embodiments without departing from the inventive concepts herein disclosed, and it is therefore desired that only such limitations be imposed on the appended claims as are stated therein or required by the prior art.

The invention claimed is:

1. The method of preparing an insoluble interpolymer comprising the steps of mixing an isoolefin having 4 to 5 inclusive carbon atoms per molecule, and a diisopropenyl substituted hydrocarbon compound having 7 to 12 inclusive carbon atoms per molecule, cooling the mixture to a temperature below −50° C., and polymerizing the mixture by the application thereto of a liquid solution of an active halide Friedel-Crafts catalyst.

2. The method of preparing an insoluble interpolymer comprising the steps of mixing isobutylene, and a diisopropenyl substituted hydrocarbon compound having 7 to 12 inclusive carbon atoms per molecule, cooling the mixture to a temperature below −50° C., and polymerizing the mixture by the application thereto of a liquid solution of an active halide Friedel-Crafts catalyst comprising aluminum chloride dissolved in an alkyl halide.

3. The method of preparing an insoluble interpolymer comprising the steps of mixing isobutylene, and dimethallyl, cooling the mixture to a temperature below −50° C., and polymerizing the mixture by the application thereto of a liquid solution of an active halide Friedel-Crafts catalyst comprising aluminum chloride dissolved in an alkyl halide.

4. The method of preparing an insoluble interpolymer comprising the steps of mixing isobutylene, and a diisopropenyl substituted hydrocarbon compound having 7 to 12 inclusive carbon atoms per molecule, cooling the mixture to a temperature below −50° C., polymerizing the mixture by the application thereto of a liquid solution of an active halide Friedel-Crafts catalyst comprising aluminum chloride dissolved in an alkyl halide, and arresting the polymerization reaction before polymerization of all of the reactants is completed.

5. The method of preparing an insoluble interpolymer comprising the steps of mixing isobutylene, and a diisopropenyl substituted hydrocarbon compound having 7 to 12 inclusive carbon atoms per molecule, cooling the mixture to a temperature below −50° C., polymerizing the mixture by the application thereto of a liquid solution of an active halide Friedel-Crafts catalyst, comprising aluminum chloride dissolved in an alkyl halide, and arresting the polymerization reaction before polymerization of all of the reactants is completed by quenching the catalyst at a low temperature, approximately that of the polymerization reaction, by the addition of propyl alcohol.

6. The method of producing an insoluble interpolymer comprising the steps of mixing together isobutylene and dimethallyl, the isobutylene being present in the mixture in the proportion of 95 parts to 99.99 parts, and the dimethallyl being present in the proportion of 0.01 part to 5 parts, adding to the mixture a diluent-refrigerant to cool the mixture to a temperature below −50° C., and polymerizing the mixture by the addition thereto of a liquid solution of an active halide Friedel-Crafts catalyst.

7. The method of producing an insoluble interpolymer comprising the steps of mixing together isobutylene and dimethallyl, the isobutylene being present in the mixture in the proportion of 70 parts to 99.99 parts, and the dimethallyl being present in the proportion of 0.01 part to 30 parts, adding to the mixture a diluent-refrigerant comprising liquid ethylene to cool the mixture to a temperature below −50° C., and polymerizing the mixture by the addition thereto of a liquid solution of an active halide Friedel-Crafts catalyst.

8. The method of producing an insoluble interpolymer comprising the steps of mixing together isobutylene and dimethallyl, the isobutylene being present in the mixture in the proportion of 70 parts to 99.99 parts, and the dimethallyl being present in the proportion of 0.01 part to 30 parts, adding to the mixture a diluent-refrigerant comprising liquid ethylene to cool the mixture to a temperature below −50° C., and polymerizing the mixture by the addition thereto of a liquid solution of an active halide Friedel-Crafts catalyst comprising aluminum chloride dissolved in a low-freezing alkyl halide.

9. The method of preparing an insoluble interpolymer comprising the steps of mixing isobutylene, and a diisopropenyl substituted hydrocarbon compound having 7 to 12 inclusive carbon atoms per molecule, cooling the mixture to a temperature below −50° C., polymerizing the mixture by the application thereto of a liquid solution of an active halide Friedel-Crafts catalyst comprising aluminum chloride dissolved in an alkyl halide, separating the polymer from residual mixture and mixing the polymer with a sulfogenetic substance containing releasable sulfur.

10. The method of preparing an isobutylene interpolymer comprising the steps of mixing isobutylene, and a diisopropenyl substituted hydrocarbon compound having 7 to 12 inclusive carbon atoms per molecule, cooling the mixture to a temperature below −50° C., polymerizing the mixture by the application thereto of a liquid solution of an active halide Friedel-Crafts catalyst comprising aluminum chloride dissolved in an alkyl halide, separating the polymer from residual mixture, mixing the polymer with a sulfogenetic substance containing releasable sulfur and curing the mixture by the application of heat.

11. An insoluble interpolymer comprising a compound each molecule of which comprises a major proportion of molecules of isobutylene interpolymerized with a minor proportion of molecules of a non-conjugated diolefin having terminal isopropenyl groups and 7 to 12 inclusive carbon atoms per molecule; the said interpolymer being characterized by a high molecular weight, within the range of 10,000 to 200,000, solidity, insolubility in the ordinary solvents, low swellability in hydrocarbon solvents and reactivity with sulfur to develop an elastic limit, a definite tensile strength at break from 2000 to 4500 pounds per square inch, an elongation at break ranging from 500% to 1100%.

12. An insoluble interpolymer comprising a compound each molecule of which comprises interpolymerized molecules of isobutylene and molecules of a non-conjugated diolefin comprising dimethallyl the said interpolymer being characterized by a high molecular weight, above at least 10,000, solidity, insolubility in the ordinary solvents, low swellability in hydrocarbon solvents and reactivity with sulfur to develop an elastic limit, a definite tensile strength at break from 2,000 to 4,500 pounds per square inch, an elongation at break ranging from 500% to 1100%.

13. An insoluble interpolymer comprising a compound each molecule of which comprises inter-polymerized molecules of isobutylene and molecules of a non-conjugated diolefin comprising dimethallyl the said interpolymer being characterized by a high molecular weight, above at least 10,000, solidity, insolubility in the ordinary solvents, low swellability in hydrocarbon solvents and reactivity with sulfur to develop an elastic limit, a definite tensile strength at break from 2,000 to 4,500 pounds per square inch, an elongation at break ranging from 500% to 1100% and a sulfogenetic substance containing releasable sulfur.

14. The process of preparing an insoluble interpolymer comprising the steps of mixing an isoolefin and a non-conjugated diolefin of the structure

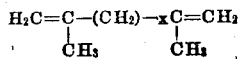

wherein X is an integer from 1 to 6, cooling the mixture to a temperature below −50° C. and polymerizing the mixture by the application thereto of a liquid solution of an active halide Friedel-Crafts catalyst.

15. The process of preparing an insoluble interpolymer comprising the steps of preparing a three-olefin-component olefinic mixture comprising isoolefinic and diolefinic substances, at least one thereof comprising a simple isoolefin having 5 to 6 inclusive carbon atoms per molecule, another thereof comprising a diisopropenyl substituted hydrocarbon compound having 7 to 12 inclusive carbon atoms per molecule; and a conjugated diolefin having 4 to 6 inclusive carbon atoms per molecule, cooling the mixture below 0° C. and polymerizing the mixture by the application thereto of a liquid solution of an active halide Friedel-Crafts catalyst.

16. The process of preparing an insoluble interpolymer comprising the steps of preparing a three-component olefinic mixture comprising isobutylene, a conjugated diolefin having 4 to 6 inclusive carbon atoms per molecule and a non-conjugated diolefin comprising a diisopropenyl substituted hydrocarbon having 7 to 12 inclusive carbon atoms per molecule, cooling the mixture below 0° C. and polymerizing the mixture by the application thereto of a liquid solution of an active halide Friedel-Crafts catalyst.

17. The process of preparing an insoluble interpolymer comprising the steps of preparing a three-component olefinic mixture comprising isobutylene, butadiene and dimethallyl, cooling the mixture below 0° C. and polymerizing the mixture by the application thereto of a liquid solution of an active halide Friedel-Crafts catalyst.

18. An insoluble interpolymer comprising a compound, each molecule of which contains a major proportion of molecules of isobutylene, a minor proportion of molecules of a conjugated diolefin having 4 to 6 inclusive carbon atoms per molecule, and a minor proportion of molecules of a non-conjugated diolefin comprising a diisopropenyl substituted hydrocarbon having 7 to 12 inclusive carbon atoms per molecule; the said interpolymer being characterized by a high molecular weight, within the range of 10,000 to 200,000, solidity, insolubility in the ordinary solvents, low swellability in hydrocarbon solvents and reactivity with sulfur to develop an elastic limit, a definite tensile strength at break from 2,000 to 4,500 pounds per square inch, an elongation at break ranging from 500% to 1100%.

19. The process of preparing an insoluble interpolymer comprising the steps of preparing a three-component olefinic mixture comprising isobutylene, isoprene and dimethallyl, cooling the mixture below 0° C. and polymerizing the mixture by the application thereto of a liquid solution of an active halide Friedel-Crafts catalyst.

20. The process of preparing an insoluble interpolymer comprising the steps of preparing a three-component olefinic mixture comprising isobutylene, dimethyl butadiene and dimethallyl, cooling the mixture below 0° C. and polymerizing the mixture by the application thereto of a liquid solution of an active halide Friedel-Crafts catalyst.

ROBERT M. THOMAS.
WILLIAM J. SPARKS.